United States Patent
Stringham et al.

(10) Patent No.: US 8,260,752 B1
(45) Date of Patent: Sep. 4, 2012

(54) SYSTEMS AND METHODS FOR CHANGE TRACKING WITH MULTIPLE BACKUP JOBS

(75) Inventors: Russell R. Stringham, Orem, UT (US); Jason Ivey, Lehi, UT (US); Erik Prusse, Highland, UT (US)

(73) Assignee: Symantec Corporation, Mountain View, CA (US)

( * ) Notice: Subject to any disclaimer, the term of this patent is extended or adjusted under 35 U.S.C. 154(b) by 271 days.

(21) Appl. No.: 12/714,687

(22) Filed: Mar. 1, 2010

(51) Int. Cl.
*G06F 7/00* (2006.01)
(52) U.S. Cl. ...................................................... 707/649
(58) Field of Classification Search .................. 707/649
See application file for complete search history.

(56) References Cited

U.S. PATENT DOCUMENTS

| | | | | |
|---|---|---|---|---|
| 2002/0103816 | A1* | 8/2002 | Ganesh et al. | 707/204 |
| 2006/0235821 | A1* | 10/2006 | Armangau et al. | 707/1 |
| 2010/0228913 | A1* | 9/2010 | Czezatke et al. | 711/112 |

* cited by examiner

*Primary Examiner* — Jensen Hu
(74) *Attorney, Agent, or Firm* — Advantedge Law Group (57) ABSTRACT

A computer-implemented method for change tracking with multiple backup jobs may include identifying a plurality of overlapping backup jobs to be performed on a volume. The computer-implemented method may also include identifying snapshots taken for any of the plurality of overlapping backup jobs. The computer-implemented method may further include, for each consecutive pair of identified snapshots, identifying changes made to the volume between the consecutive pair of identified snapshots and saving a list of the changes. The computer-implemented method may additionally include supplying the list of changes for each backup job in the plurality of overlapping backup jobs that requires the list of changes. The computer-implemented method may also include determining that no remaining backup job in the plurality of overlapping jobs requires the list of changes and deleting the list of changes. Various other methods, systems, and computer-readable media are also disclosed.

18 Claims, 6 Drawing Sheets

SYSTEMS AND METHODS FOR CHANGE TRACKING WITH MULTIPLE BACKUP JOBS

BACKGROUND

In the digital age, organizations increasingly rely on digitally-stored data. To protect against data loss, an organization may use a backup system to back up important data. For example, an organization may configure a backup system to run a backup job that incrementally backs up data on a volume on a daily basis.

In order to provide incremental backups, a backup system may track changes made to a volume of data (e.g., by using a change tracking driver) until the next scheduled incremental backup. The backup system may then use a list of the tracked changes to determine which blocks of data to capture in the incremental backup. The list may then be cleared in order to start tracking changes for a subsequent incremental backup.

In some cases, an organization may require multiple simultaneous backup jobs. For example, the organization may wish to have one backup job incrementally backing up data on a volume on a daily basis and another backup job incrementally backing up data on the volume on a weekly basis. However, traditional block-based backup systems may not consistently allow for overlapping backup jobs running on different schedules. For example, a backup job may start an incremental backup on a volume, and a traditional backup system may start tracking changes made to data on the volume. A second backup job may then begin and end an incremental backup, clearing the change list for the volume. When the first backup job runs again, it may accordingly fail to capture any changes made before the second backup began its incremental backup.

SUMMARY

As will be described in greater detail below, the instant disclosure generally relates to systems and methods for change tracking with multiple backup jobs. Embodiments of the instant disclosure may accurately track changes for multiple overlapping backup jobs on different schedules by saving a list of changes made between each consecutive pair of snapshots taken for the overlapping backup jobs. Embodiments described herein may then supply saved change lists to a backup job as needed in order to reconstruct a complete list of changes made between two snapshots taken by the backup job. For example, a method may include identifying a plurality of overlapping backup jobs to be performed on a volume and identifying snapshots taken for any of the plurality of overlapping backup jobs. The method may also include, for each consecutive pair of identified snapshots, identifying changes made to the volume between the consecutive pair of identified snapshots, saving a list of the changes, supplying the list of changes for each backup job in the plurality of backup jobs that requires the list of changes, determining that no remaining backup job in the plurality of change tracking jobs requires the list of changes, and deleting the list of changes.

The plurality of backup jobs may include a variety of types of backup jobs. For example, the plurality of backup jobs may include an incremental backup job and/or a differential backup job. In some examples, the plurality of backup jobs may include a block-based backup. Additionally, in some examples, the plurality of backup jobs may include a backup job configured to track changes to at least one additional volume.

Determining that no remaining backup job in the plurality of backup jobs requires the list of changes may include a variety of approaches. For example, determining that no remaining backup job requires the list of changes may include creating, for each backup job that requires the list of changes, an association in a database with the list of changes. In this example, the method may also include removing the association for each backup job after the backup job no longer requires the list of changes and determining that no association with the list of changes remains in the database.

In another example, determining that no remaining backup job requires the list of changes may include creating a reference count that tallies the number of backup jobs that require the list of changes, decrementing the reference count for each backup job that no longer requires the list of changes, and ultimately determining that the reference count equals zero.

In an additional example, determining that no remaining backup job requires the list of changes may include creating a list of backup jobs that require the list of changes, removing each backup job from the list of backup jobs after the backup job no longer requires the list of changes, and ultimately determining that the list of backup jobs is empty. Removing each backup job from the list of backup jobs after the backup job no longer requires the list of changes may include configuring each backup job to remove itself from the list of backup jobs after the backup job no longer requires the list of changes, identifying at least one inactive backup job in the list of backup jobs, and then removing the inactive backup job from the list of backup jobs.

In some contexts, the identified snapshots may include a modifiable snapshot. In such contexts, the method may also include identifying changes made to the modifiable snapshot, saving a list of the changes made to the modifiable snapshot, supplying the list of changes made to the modifiable snapshot to the backup job that is responsible for the modifiable snapshot, and then deleting the list of changes made to the modifiable snapshot.

In some examples, an interruption in change tracking may occur. In these examples, the method may also include identifying an interruption in change tracking between a first snapshot taken for an interrupted backup job and a second snapshot taken for the interrupted backup job. The method may additionally include identifying ambiguous portions of the volume (e.g., those portions that may have been changed concurrently with the interruption but which are not listed as changed), identifying at least one uninterrupted list of changes between the first snapshot and the second snapshot, and marking as changed each ambiguous portion of the volume that is listed in the uninterrupted list of changes.

In some examples, a system for change tracking with multiple backup jobs may include an identification module, a saving module, a supplying module, a deletion module, and at least one processor. The identification module may be programmed to identify a plurality of overlapping backup jobs to be performed on a volume and identify snapshots taken for any of the plurality of overlapping backup jobs. The saving module may be programmed to, for each consecutive pair of identified snapshots, identify changes made to the volume between the consecutive pair of identified snapshots and save a list of the changes. The supplying module may be programmed to supply the list of changes for each backup job in the plurality of backup jobs that requires the list of changes. The deletion module may be programmed to determine that no remaining backup job in the plurality of change tracking jobs requires the list of changes and to then delete the list of changes.

The plurality of backup jobs may include a variety of types of backup jobs. For example, the plurality of backup jobs may include an incremental backup job and/or a differential backup job.

The deletion module may be programmed to determine that no remaining backup job in the plurality of backup jobs requires the list of changes using a variety of approaches. For example, the deletion module may be programmed to create, for each backup job that requires the list of changes, an association in a database with the list of changes. In this example, the deletion module may also be programmed to remove the association for each backup job after the backup job no longer requires the list of changes and to determine that no association with the list of changes remains in the database.

In another example, the deletion module may be programmed to determine that no remaining backup job requires the list of changes by creating a reference count that tallies the number of backup jobs that require the list of changes, decrementing the reference count for each backup job once the backup job no longer requires the list of changes, and ultimately determining that the reference count equals zero.

In an additional example, the deletion module may be programmed to determine that no remaining backup job requires the list of changes by creating a list of backup jobs that require the list of changes, removing each backup job from the list of backup jobs after the backup job no longer requires the list of changes, and ultimately determining that the list of backup jobs is empty. The deletion module may be programmed to remove each backup job from the list of backup jobs after the backup job no longer requires the list of changes by configuring each backup job to remove itself from the list of backup jobs after the backup job no longer requires the list of changes, identifying at least one inactive backup job in the list of backup jobs, and then removing the inactive backup job from the list of backup jobs.

In some contexts, the identified snapshots may include a modifiable snapshot. In such contexts, the saving module may be further programmed to identify changes made to the modifiable snapshot and to save a list of the changes made to the modifiable snapshot. Additionally, the supplying module may be further programmed to supply the list of changes made to the modifiable snapshot to the backup job that is responsible for the modifiable snapshot. Furthermore, the deletion module may be further programmed to delete the list of changes made to the modifiable snapshot.

In some embodiments, a computer-readable-storage medium may include one or more computer-executable instructions that, when executed by at least one processor of a computing device, may cause the computing device to identify a plurality of overlapping backup jobs to be performed on a volume and identify snapshots taken for any of the plurality of overlapping backup jobs. The computer-executable instructions may also cause the computing device to, for each consecutive pair of identified snapshots, identify changes made to the volume between the consecutive pair of identified snapshots and save a list of the changes. The computer-executable instructions may further cause the computing device to supply the list of changes for each backup job in the plurality of backup jobs that requires the list of changes, determining that no remaining backup job in the plurality of change tracking jobs requires the list of changes, and deleting the list of changes.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for change tracking with multiple backup jobs. Systems and methods described herein may coordinate tracking for a plurality of overlapping backup jobs (such as overlapping incremental backup jobs) by saving a list of changes made between each consecutive pair of snapshots taken for the overlapping backup jobs. Systems and methods described herein may then supply saved change lists to a backup job as needed in order to reconstruct a complete list of changes made between two snapshots taken by the backup job. By saving change lists between consecutive snapshots and supplying the change lists to backup jobs that require knowledge of changes that occurred between the consecutive snapshots, systems and methods described herein may enable overlapping backup jobs to accurately track changes between snapshots without interfering with each other.

Figure 1:
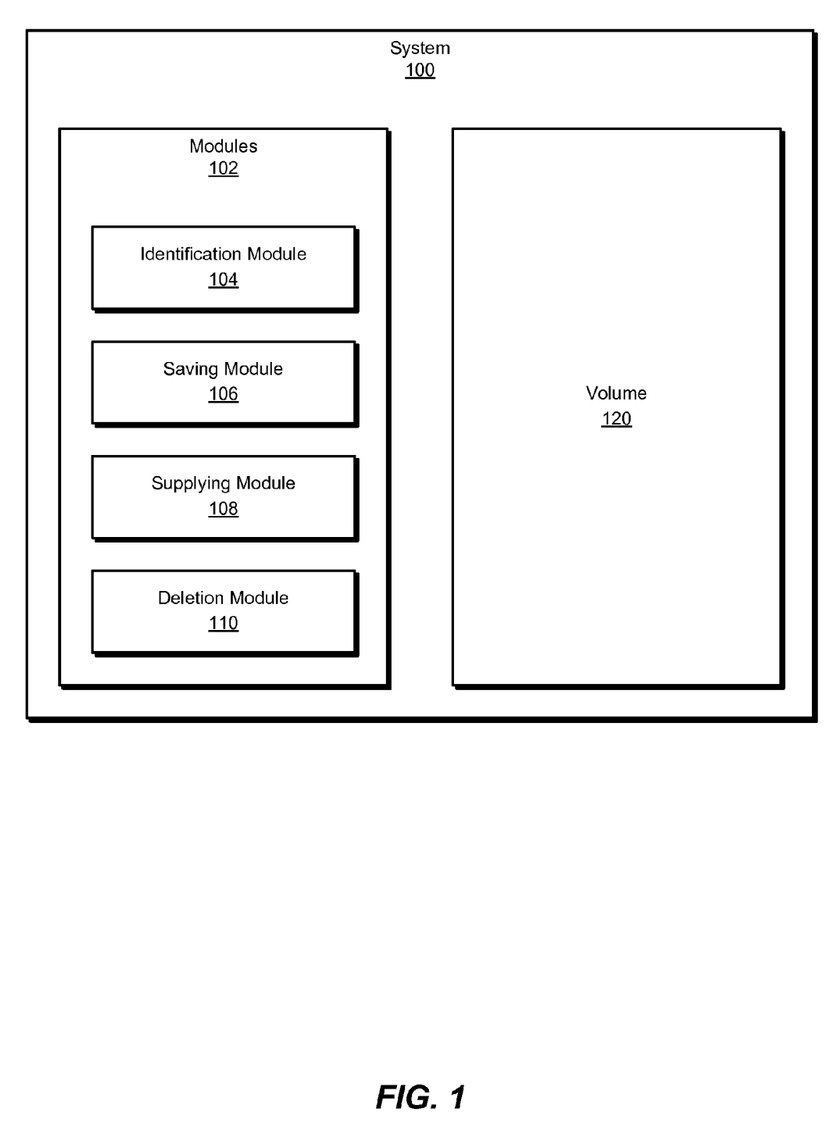
FIG. 1 is a block diagram of an exemplary system for change tracking with multiple backup jobs.
Figure 2:
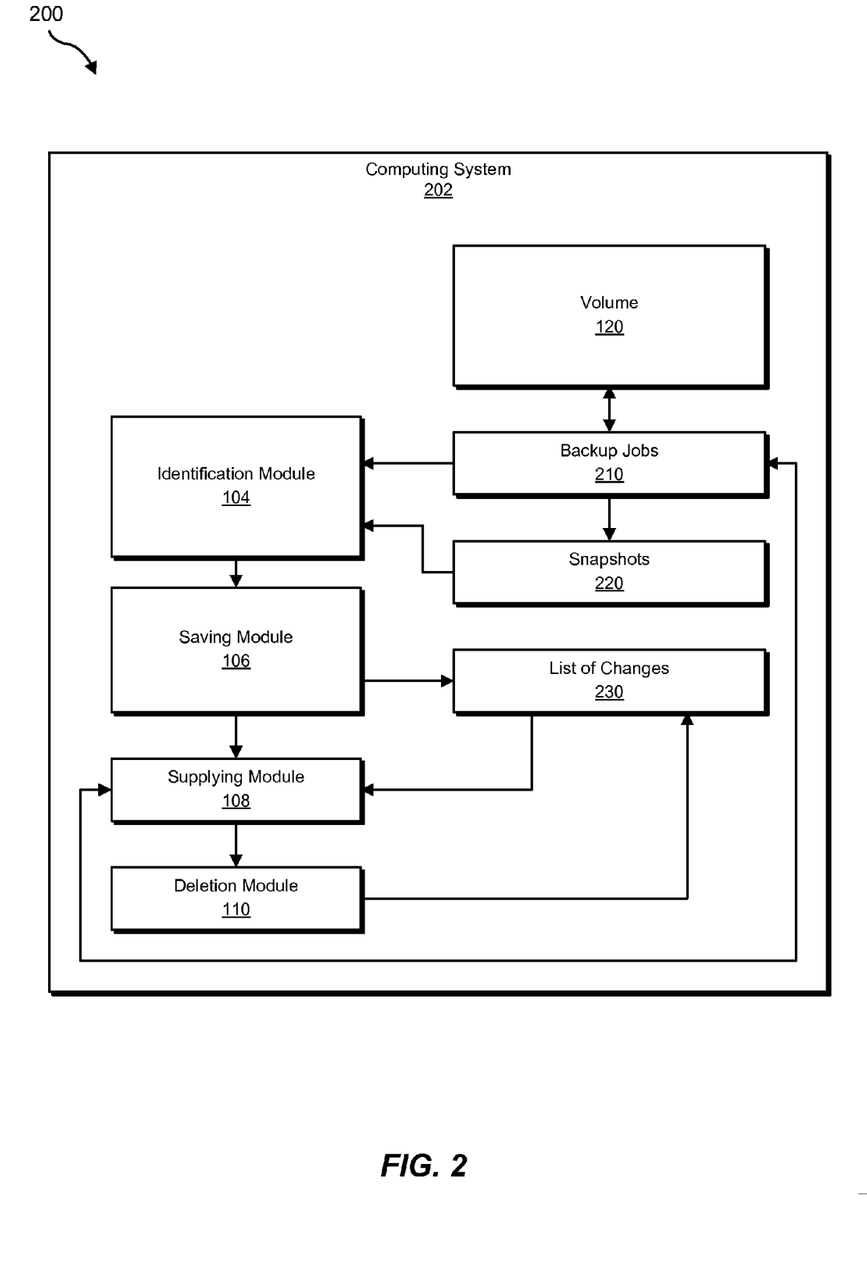
FIG. 2 is a block diagram of an exemplary system for change tracking with multiple backup jobs.

The following will provide, with reference to FIGS. 1-2, detailed descriptions of exemplary systems for change tracking with multiple backup jobs. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for change tracking with multiple backup jobs. As illustrated in this figure, exemplary system 100 may include one or more modules 102 for performing one or more tasks. For example, and as will be explained in greater detail below, exemplary system 100 may include an identification module 104 programmed to identify a plurality of overlapping backup jobs to be performed on a volume and to identify snapshots taken for any of the plurality of overlapping backup jobs. Exemplary system 100 may also include a saving module 106 programmed to, for each consecutive pair of identified snapshots, identify changes made to the volume between the consecutive pair of identified snapshots and save a list of the changes. Exemplary system 100 may further include a supplying module 108 programmed to supply the list of changes for each backup job in the plurality of overlapping backup jobs that requires the list of changes.

In addition, and as will be described in greater detail below, exemplary system 100 may include a deletion module 110 programmed to determine that no remaining backup job in the plurality of overlapping jobs requires the list of changes and to then delete the list of changes. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a volume 120. Volume 120 may represent portions of a single data volume or computing device or a plurality of data volumes or computing devices. For example, volume 120 may represent a portion of computing system 510 in FIG. 5 and/or portions of exemplary network architecture 600 in FIG. 6. Alternatively, volume 120 in FIG. 1 may represent one or more physically separate devices capable of being accessed by a computing device, such as computing system 510 in FIG. 5 and/or portions of exemplary network architecture 600 in FIG. 6. As used herein, the term "volume" may refer to any collection of data.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 including volume 120. In one embodiment, and as will be described in greater detail below, computing system 202 may include identification module 104, saving module 106, supplying module 108, and deletion module 110.

Identification module 104 may identify a plurality of overlapping backup jobs to be performed on a volume. For example, identification module 104 may identify backup jobs 210 to be performed on volume 120. Identification module 104 may also identify snapshots taken for any of the plurality of overlapping backup jobs. For example, identification module 104 may identify snapshots 220 taken for backup jobs 210.

Saving module 106 may, for each consecutive pair of identified snapshots, identify changes made to the volume between the pair of identified snapshots. For example, saving module 106 may identify changes made to volume 120 for each consecutive pair of snapshots in snapshots 220. Saving module 106 may then save a list of the changes. For example, saving module 106 may save a list of changes 230.

Supplying module 108 may supply the list of changes for each backup job in the plurality of overlapping backup jobs that requires the list of changes. For example, supplying module 108 may supply the list of changes 230 for each backup job in backup jobs 210 that requires list of changes 230.

At some point, deletion module 110 may determine that no remaining backup job in the plurality of overlapping jobs requires the list of changes. For example, deletion module 110 may determine that none of backup jobs 210 requires list of changes 230. Deletion module 110 may then delete list of changes 230.

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Figure 3:
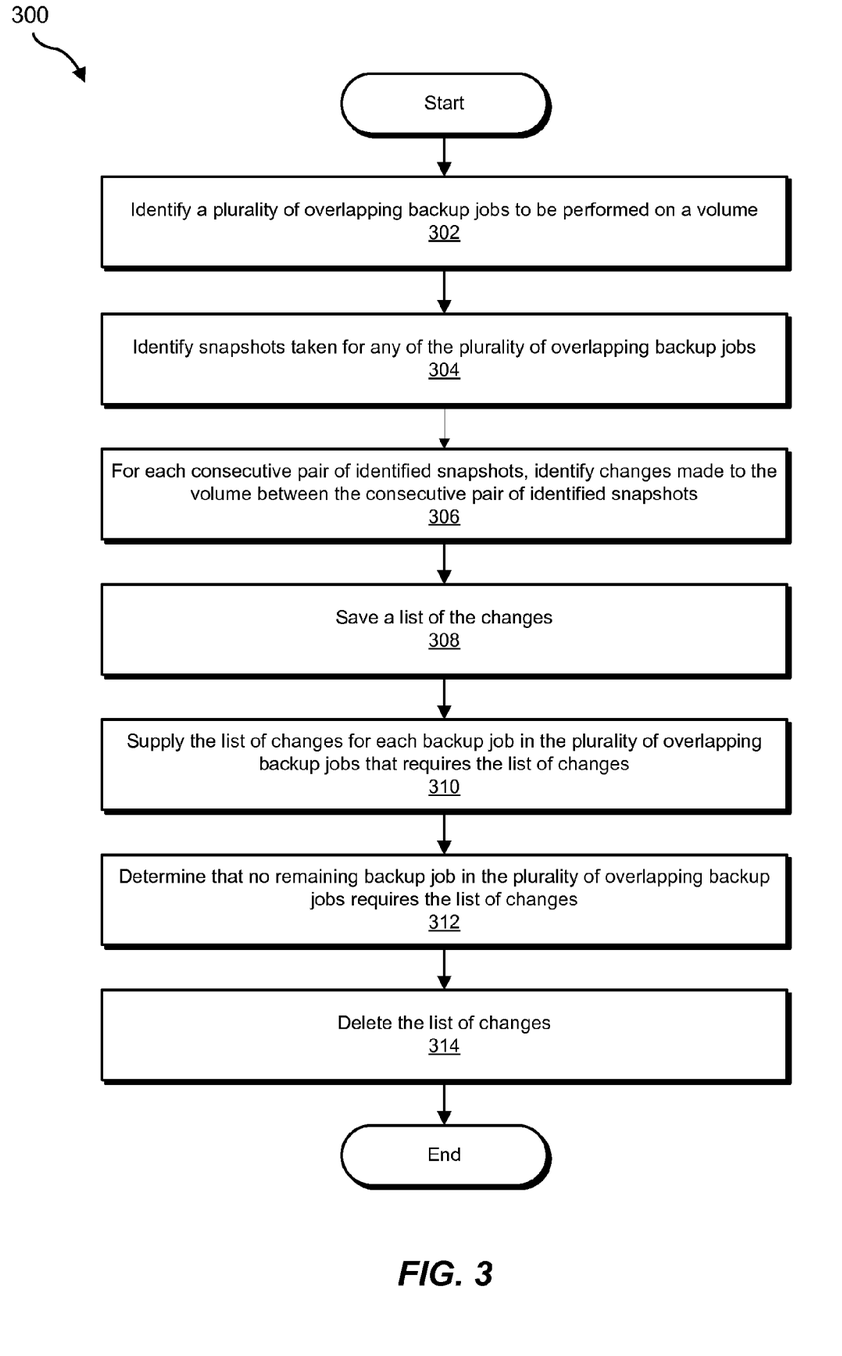
FIG. 3 is a flow diagram of an exemplary method for change tracking with multiple backup jobs.

FIG. 3 is a flow diagram of an exemplary computer-implemented method 300 for change tracking with multiple backup jobs. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a plurality of overlapping backup jobs to be performed on a volume. For example, at step 302 identification module 104 may, as part of computing system 202, identify backup jobs 210 to be performed on volume 120.

As used herein, the phrase "backup job" may to refer any job that requires changes to a volume to be tracked. The term "job" may refer to any job, process, and/or daemon that collects, uses, and/or relies on tracked changes. Additionally or alternatively, the term "job" may refer to any plan and/or schedule for tracking changes to a volume. For example, a backup system (such as SYMANTEC BACKUP EXEC SYSTEM RECOVERY) may perform a backup job by taking a snapshot of a volume and creating a base backup of the volume using the snapshot as a quiesced basis for the backup. After the backup system creates the snapshot, a change-tracking driver may start monitoring changes to data on the volume. To take an incremental backup, the backup system may create an additional snapshot and back up data changed between the original snapshot and the additional snapshot. In some embodiments, a backup job may include tracking changes to blocks of data on a volume. As used herein, the term "block" may refer to a block, sector, cluster, region, and/or any other suitable unit of data.

A backup job may operate in various scopes. For example, a backup job may include an incremental backup job (such as an incremental backup). An incremental backup job may track changes to a volume between each consecutive pair in a series of points in time. Additionally or alternatively, a backup job may include a differential backup job (such as a differential backup). A differential backup job may track changes to a volume since a base point in time.

Figure 4:
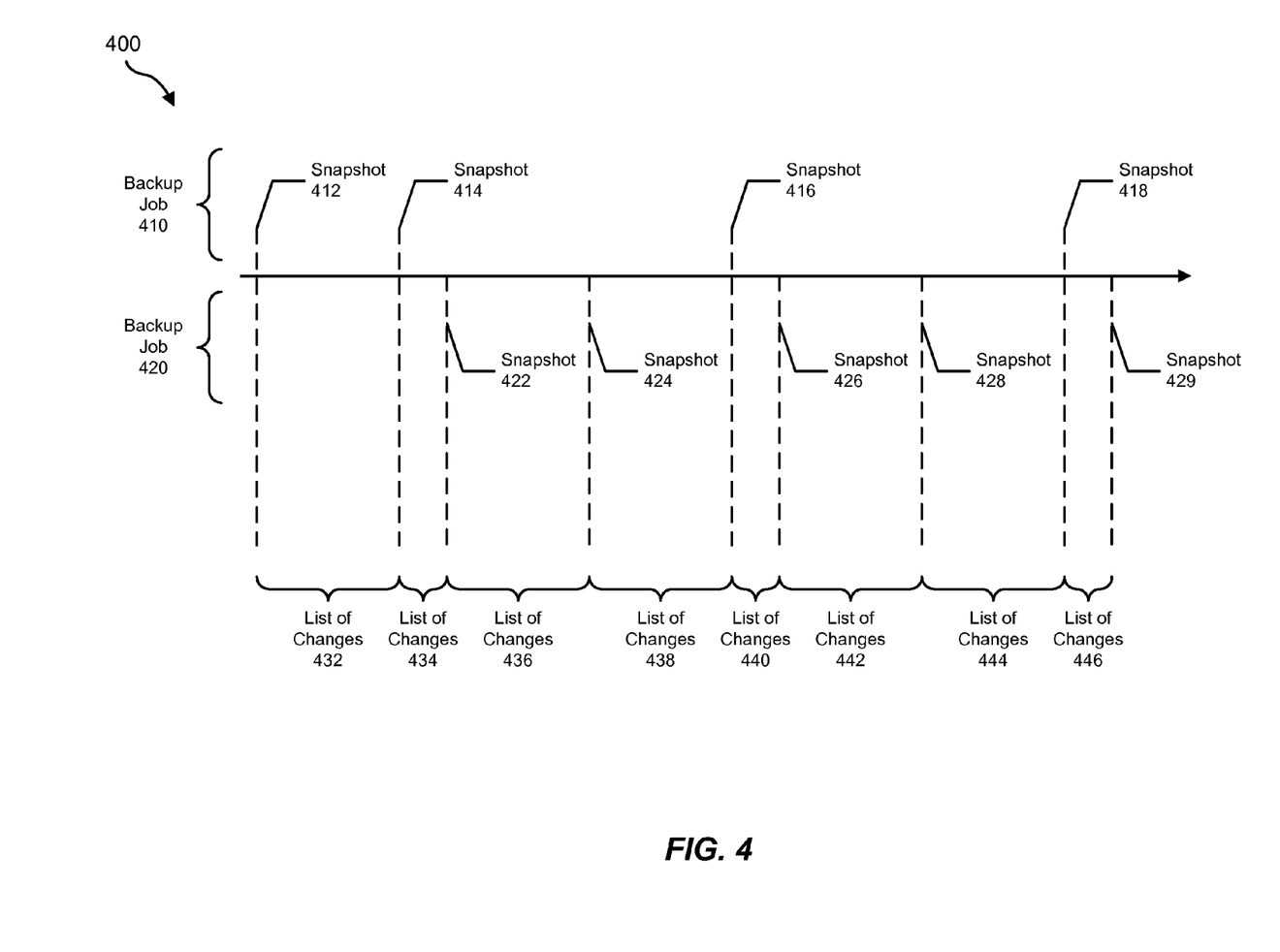
FIG. 4 is a diagram of an exemplary timeline of change tracking with multiple backup jobs.

Using FIG. 4 as an example, a timeline 400 illustrates two overlapping backup jobs: a backup job 410 and a backup job 420. Backup job 410 may take snapshots 412, 414, 416, and

418. Backup job 420 may take snapshots 422, 424, 426, 428, and 429. Backup job 410 may be configured to track changes made to a volume between each consecutive pair of its corresponding snapshots (e.g., snapshots 412 and 414, snapshots 414 and 416, and snapshots 416 and 418). Likewise, backup job 420 may be configured to track changes made to the volume between each consecutive pair of its corresponding snapshots.

In some examples, the plurality of backup jobs may include a backup job that is configured to track changes to least one additional volume. For example, one backup job in the plurality of backup jobs may be configured to back up volumes "C:", "D:", and "E:" associated with a database. Another backup job in the plurality of backup jobs may be configured to back up database files associated with another database located on a volume "F:" that may also store some configuration files on volume "C:". As described earlier, traditional back up technologies may fail to accurately implement both backup jobs due to change-tracking conflicts for volume "C:", but by saving lists of tracked changes for both backup jobs until both backup jobs have the necessary information, embodiments of the instant disclosure may enable accurate change-tracking for both jobs.

Identification module 104 may perform step 302 in any suitable manner. For example, identification module 104 may identify the plurality of overlapping backup jobs to be performed on the volume by reading a configuration file. Additionally or alternatively, identification module 104 may identify the plurality of overlapping backup jobs by receiving a communication from a backup system.

Returning to FIG. 3, at step 304 one or more of the systems described herein may identify snapshots taken for any of the plurality of overlapping backup jobs. For example, at step 304 identification module 104 may, as part of computing system 202, identify snapshots 220 taken for backup jobs 210. As used herein, the term "snapshot" may refer to any representation of a volume and/or a portion of a volume in a certain state and/or point in time.

Identification module 104 may perform step 304 in any suitable manner. For example, identification module 104 may identify the snapshots by receiving one or more communications from a backup system identifying snapshots as they are taken. Additionally or alternatively, identification module 104 may monitor one or more system files that identify snapshots taken. In some examples, identification module 104 may receive one or more communications from a change-tracking driver identifying snapshots as they are taken. For example, identification module 104 may configure the change-tracking driver to send such communications and/or request such communications from the change-tracking driver.

Using FIG. 4 as an example, identification module 104 may identify snapshots 412, 414, 416, 418, 422, 424, 426, 428, and 429. As will be described below, in some examples identification module 104 may identify which backup job is responsible for which snapshots. For example, identification module 104 may associate snapshots 422, 424, 426, 428, and 429 with backup job 420.

In some examples, identification module 104 may identify the snapshots as they are created. According to certain embodiments, identification module 104 may identify snapshots before they are created (e.g., by observing an instruction to create them and/or an instruction that will lead to their creation).

In some embodiments, the identified snapshots may include one or more modifiable snapshots. As will be described in greater detail below, systems described herein may identify and save changes made to modifiable snapshots for reference by backup jobs.

Returning to FIG. 3, at step 306 one or more of the systems described herein may, for each consecutive pair of identified snapshots, identify changes made to the volume between the consecutive pair of identified snapshots. For example, at step 306 saving module 106 may, as part of computing system 202, identify changes made to volume 120 between each consecutive pair of snapshots in snapshots 220.

The phrase "consecutive pair of snapshots" may refer to a consecutive pair of snapshots taken for one backup job as well as to a consecutive pair of snapshots taken for two different backup jobs. Using FIG. 4 as an example, snapshots 412 and 414 may be a consecutive pair of snapshots. Accordingly, saving module 106 may identify changes made between snapshots 412 and 414. Additionally, snapshots 414 and 422 may be a consecutive pair of snapshots. Accordingly, saving module 106 may identify changes made between snapshots 414 and 422.

Saving module 106 may perform step 306 in any suitable manner. For example, saving module 106 may include at least a portion of a change-tracking driver configured to track changes made between consecutive pairs of snapshots. Additionally or alternatively, saving module 106 may query the change-tracking driver for its current internal list of changes and/or identify the current list of changes internal to the driver in memory and/or in a file. In some examples, saving module 106 may identify the changes before the change-tracking driver clears its current internal list of changes (e.g., directly before the second snapshot in the consecutive pair is taken).

Using FIG. 4 as an example, when snapshot 414 is created for backup job 410, a change-tracking driver may clear an internal list of changes and start tracking changes made subsequent to snapshot 414. When snapshot 422 is created for backup job 420 and before the internal list of changes is cleared, the internal list of changes may be a list of changes 434. Accordingly, saving module 106 may identify list of changes 434.

Returning to FIG. 3, at step 308 one or more of the systems described herein may save a list of the changes. For example, at step 308 saving module 106 may, as part of computing system 202, save list of changes 230. As used herein, the term "list" may refer to any suitable data structure, including but not limited to a list, a set, a bitmap, a hash table, etc.

According to some embodiments, the list of changes may include references to blocks of data in the volume that were changed. Additionally or alternatively, the list of changes may include the changed data and/or changes to the data. In other words, the term "changes" may refer to references to what was changed, the results of the changes, and/or the actual delta of the changes.

Saving module 106 may perform step 308 in any suitable manner. For example, saving module 106 may save the list of the changes by copying the list of the changes into memory and/or to a file. In some examples, saving module 106 may save the list of changes by instructing that the list of the changes be saved (e.g., saving module 106 may instruct a change-tracking driver that had tracked the changes to save a copy of the changes). The saving module 106 may save the list by simply requesting the change-tracking driver to retain the list in its memory until such time as it is notified that the list is no longer needed.

Using FIG. 4 as an example, if saving module 106 identified changes made between snapshot 414 and snapshot 422, saving module 106 may save a list of changes 434.

Returning to FIG. 3, at step 310 one or more of the systems described herein may supply the list of changes for each backup job in the plurality of overlapping backup jobs that requires the list of changes. For example, at step 310 supplying module 108 may, as part of computing system 202, supply list of changes 230 for each backup job in backup jobs 210 that requires list of changes 230.

A backup job may require a list of changes if the backup job includes tracking changes made during the time of the list of changes. Using FIG. 4 as an example, backup job 410 may require changes made between snapshot 414 and snapshot 416 (e.g., to perform an incremental backup). Accordingly, backup job 410 may require lists of changes 434, 436, and 438.

Supplying module 108 may perform step 310 in a variety of ways. For example, supplying module 108 may transmit the list of changes to each backup job that requires the list of changes. Additionally or alternatively, supplying module 108 may save the list of changes in a location where the backup jobs may retrieve the list. In some examples, supplying module 108 may include at least a portion of a change-tracking driver. In these examples, supplying module 108 may supply the list of changes as part of the change-tracking driver.

In some examples, supplying module 108 may stitch the list of changes with one or more additional lists of changes before supplying the list to a backup job. Using the example from FIG. 4 above, if backup job 410 requires list of changes 434 as part of the changes between snapshots 414 and 416, supplying module 108 may supply list of changes 434 along with lists of changes 436 and 438 to backup job 410 (e.g., reconstructing what backup job 410 may have expected from a change-tracking driver in the absence of backup job 420).

Returning to FIG. 3, at step 312 one or more of the systems described herein may determine that no remaining backup job in the plurality of overlapping jobs requires the list of changes. For example, at step 312 deletion module 110 may, as part of computing system 202, determine that no remaining backup job in backup jobs 210 requires list of changes 230.

Deletion module 110 may perform step 312 in a variety of ways. For example, deletion module 110 may create an association in a database with the list of changes for each backup job in the plurality of backup jobs that requires the list of changes. As used herein, the term "database" may refer to any system and/or data structure for storing and/or associating data. For example, deletion module 110 may create a database entry for each backup job and associate the list of changes with each backup job that requires the list of changes. After the backup job no longer requires the list of changes, deletion module 110 may remove the association between the backup job and the list of changes (e.g., deletion module 110 may delete a reference to the list of changes from a database entry for the backup job). In some examples, deletion module 110 may determine that the backup job no longer requires the list of changes by receiving a message from the backup job signaling that the backup job no longer requires the list of changes. At some point, deletion module 110 may determine that no association with the list of changes remains in the database. For example, deletion module 110 may perform a query on the database for the list of changes that yields no results.

Using FIG. 4 as an example, deletion module 110 may associate list of changes 438 with both backup job 410 and backup job 420 in a database. Supplying module 108 may directly thereafter supply list of changes 438 to backup job 410. Deletion module 110 may accordingly disassociate list of changes 438 from backup job 410. Alternatively, deletion module 110 may await notification from backup job 410 that backup job 410 no longer requires list of changes 438 before disassociating the two. Upon the creation of snapshot 426, supplying module 108 may supply list of changes 438 to backup job 420. Deletion module 110 may accordingly disassociate list of changes 438 from backup job 420. Deletion module 110 may then query the database and discover that list of changes 438 is no longer associated with any backup job.

In an additional example, deletion module 110 may perform step 312 by creating a reference count that tallies the number of backup jobs in the plurality of overlapping backup jobs that require the list of changes. For example, deletion module 110 may maintain a table of the lists of changes and increment a reference count for each list of changes for backup jobs that require the list of changes. Deletion module 110 may additionally decrement the reference count for each backup job once the backup job no longer requires the list of changes (e.g., deletion module 110 may receive a communication from a backup job that it has successfully received the list of changes; deletion module 110 may then decrement the reference count for that list of changes). In some examples, a backup job may no longer require the list of changes if the backup job is canceled. At some point, deletion module 110 may determine that the reference count for the list of changes equals zero (e.g., a value that indicates that no backup job presently requires the list of changes).

In a further example, deletion module 110 may perform step 312 by creating a list of backup jobs that require the list of changes. For example, deletion module 110 may create a list of Globally Unique Identifiers ("GUIDs") that correspond to backup jobs that require the list of changes. Deletion module 110 may remove each backup job from the list of backup jobs after the backup job no longer requires the list of changes. In some examples, deletion module 110 may configure each backup job to remove itself from the list of backup jobs after the backup job no longer requires the list of changes. For example, deletion module 110 may include at least a portion of a process that includes the backup job. Deletion module 110 may accordingly identify when the backup job has finished using the list of changes and remove the backup job from the list of backup jobs on behalf of the backup job. In some examples, deletion module 110 may identify an inactive backup job (e.g., a backup job that was stalled, prematurely terminated, and/or cancelled). In these examples, deletion module 110 may remove the inactive backup job from the list of backup jobs so that it may no longer be counted as requiring the list of changes. At some point, deletion module 110 may determine that the list of backup jobs requiring the list of changes is empty.

Returning to FIG. 3, at step 314 one or more of the systems described herein may delete the list of changes. For example, at step 314 deletion module 110 may, as part of computing system 202, delete list of changes 230.

Deletion module 110 may perform step 314 in any suitable manner. For example, after determining that no remaining backup job requires the list of changes, deletion module 110 may delete a file that stored the list of changes, deallocate the list of changes from memory, and/or allow another module (such as a change-tracking driver) to deallocate the list of changes.

After performing step 314 for the last of the saved lists of changes, method 300 may terminate.

As mentioned earlier, in some embodiments the identified snapshots may include one or more modifiable snapshots (e.g., a snapshot created in MICROSOFT WINDOWS). In these embodiments, systems and methods described herein may identify and save changes made to the modifiable snapshots and supply the changes to the backup jobs. For example, saving module 106 may identify changes made to a modifiable snapshot and save a list of the changes. Supplying module 108 may additionally supply the list of changes made to the modifiable snapshot to the backup job responsible for the modifiable snapshot. Generally, supplying module 108 may supply the list of changes made to the modifiable snapshot to the responsible backup job using any suitable technique discussed earlier with respect to supplying lists of changes between snapshots to backup jobs. The backup job responsible for the modifiable snapshot may include a backup job that requested the creation of the snapshot.

Once the backup job responsible for the modifiable snapshot no longer requires the list of changes made to the modifiable snapshot, deletion module 110 may delete the list of changes made to the modifiable snapshot. The backup job responsible for the modifiable snapshot may require the list of changes in at least two different contexts. In one context, the backup job responsible for the modifiable snapshot may require the list of changes for a backup based from the modifiable snapshot. In another context, the backup job responsible for the modifiable snapshot may require the list of changes for a subsequent backup which may require changes since a previous backup including changes made to a previous modifiable snapshot. If the current backup performed by a backup job or the next backup performed by the backup job is a full backup, the backup job may only require the list of changes once, and deletion module 110 may delete the list of changes thereafter.

Using FIG. 4 as an example, when snapshot 412 is created, snapshot 412 may be modified resulting in a snapshot 412'. Saving module 106 may capture these changes into a change list. When snapshot 414 is created, it too may be modified such that snapshot 414' is the volume as it must be backed up and the incremental backup must capture all changes since 412', namely change lists for snapshots 412-412', 412-414 and 414-414'. In some examples, saving module 106 may combine these change lists into a single change list containing all of the changes specified by any of the lists. For example, rather than saving the change lists for snapshots 412-412' and 412-414 separately, saving module 106 may combine them into a combined change list for snapshots 412-414 (i.e., list of changes 432) even though the combined change list would also contain changes that did not happen between snapshots 412 and 414.

Once an incremental backup from snapshot 414 is created, the change list for modifiable snapshot 412-412' may no longer be needed, but 414-414' may be required for creating an incremental backup from snapshot 416. When the incremental backup for snapshot 416 is actually created, supplying module 108 may combine change lists for snapshots 414-414', 414-422, 422-424, 424-416 and 416-416'. The incremental backup from snapshot 416 may not require change lists for snapshots 422-422' or 424-424'. However, even if the incremental backup from snapshot 416 used the change lists 422-422' and 424-424', the incremental backup may still be valid; in this scenario, the incremental backup may merely capture data that did not change between snapshots 414 and 416, resulting in a larger backup than necessary.

In some embodiments, an interruption in change tracking may occur. In these examples, systems and methods described herein may need to recover from the interruption. For example, modules 102 may include a recovery module for correcting lists of changes after an interruption in change tracking. In one example, the recovery module may identify an interruption in change tracking between a first snapshot taken for an interrupted backup job and a second snapshot taken for the interrupted backup job. For example, the recovery module may determine that a computing system that was performing the change tracking crashed. The recovery module may then identify ambiguous portions of the volume (e.g., those portions that may have been changed concurrently with the interruption but which are not listed as changed). The recovery module may then reconcile the ambiguous portions of the volume (e.g., determine which ambiguous portions of the volume to list as changed. Since reconciliation may only need to happen on the backup job level, the recovery module may more efficiently perform reconciliation by identifying lists of changes that did not experience an interruption and marking any ambiguous portions of the volume as changed if previously changed in an identified uninterrupted list of changes.

The reconciliation process by the recovery module may be optimized if the first snapshot created after the interruption is part of the same backup job used to create the last snapshot before the interruption. Using FIG. 4 as an example, if an interruption to change-tracking occurred between snapshots 426 and 428, after creating a reconciled change list between snapshots 426' and 428' (where a snapshot X' represents a modified version of a snapshot X as described earlier with reference to modifiable snapshots) for an incremental backup for snapshot 428, the reconciled change list may be used to reduce the work to reconcile for a backup from snapshot 418. If no changes exist between snapshots 426-426' or between snapshots 428-428', and if the backup for snapshot 418 requires the change lists between snapshots 416-416', 416-426, 426-428, 428-418, and 418-418', no additional reconciliation may be necessary since those change lists may be intact.

If snapshot 426 differs from snapshot 426' and/or snapshot 428 differs from snapshot 428', the recovery module may ignore any changes identified in those two change lists that correspond to unambiguous portions of the volume. For any differences pertaining to ambiguous portions of the volume, the recovery module may either simply mark the relevant blocks as changed and/or perform a reconciliation procedure on those blocks. As an example, 1% of blocks on the volume may be ambiguous after the interruption. A reconciliation may be performed to create a change list between snapshots 426' and 428' by reading and comparing 90% of the ambiguous blocks (0.9% of the total blocks), where the remaining 10% of unknown status blocks may not be allocated to the file system and so may not be captured by a back up in any case. 30% of ambiguous blocks (0.27% of all blocks) that are reconciled may be found to be different and may be captured by the backup for snapshot 428. When the backup for 418 runs, the recovery module may omit performing a reconciliation for ambiguous blocks that did not change between snapshots 426-426' or 428-428'. Instead, the backup for 418 may use the results of that reconciliation. Only 3% of ambiguous blocks may have changed between snapshots 426-426' or 428-428'. The recovery module may treat as changed any ambiguous blocks that were not part of the file system at the time of snapshot 428' but that were part of the file system at the time of snapshot 418'. Accordingly, the backup for snapshot 418 may only require a reconciliation of 0.06% of all blocks on the volume rather than 0.9% of the blocks on the volume.

By saving change lists between each pair of consecutive snapshots taken for a plurality of overlapping backup jobs, embodiments of the instant disclosure may allow for accurate and efficient change-tracking among overlapping backup jobs. Additionally, by saving all of the necessary change lists, embodiments of the instant disclosure may provide support for differential backups. Furthermore, embodiments of the instant disclosure may more efficiently recover from interruptions to change tracking by reducing the amount of reconciliation necessary.

Figure 5:
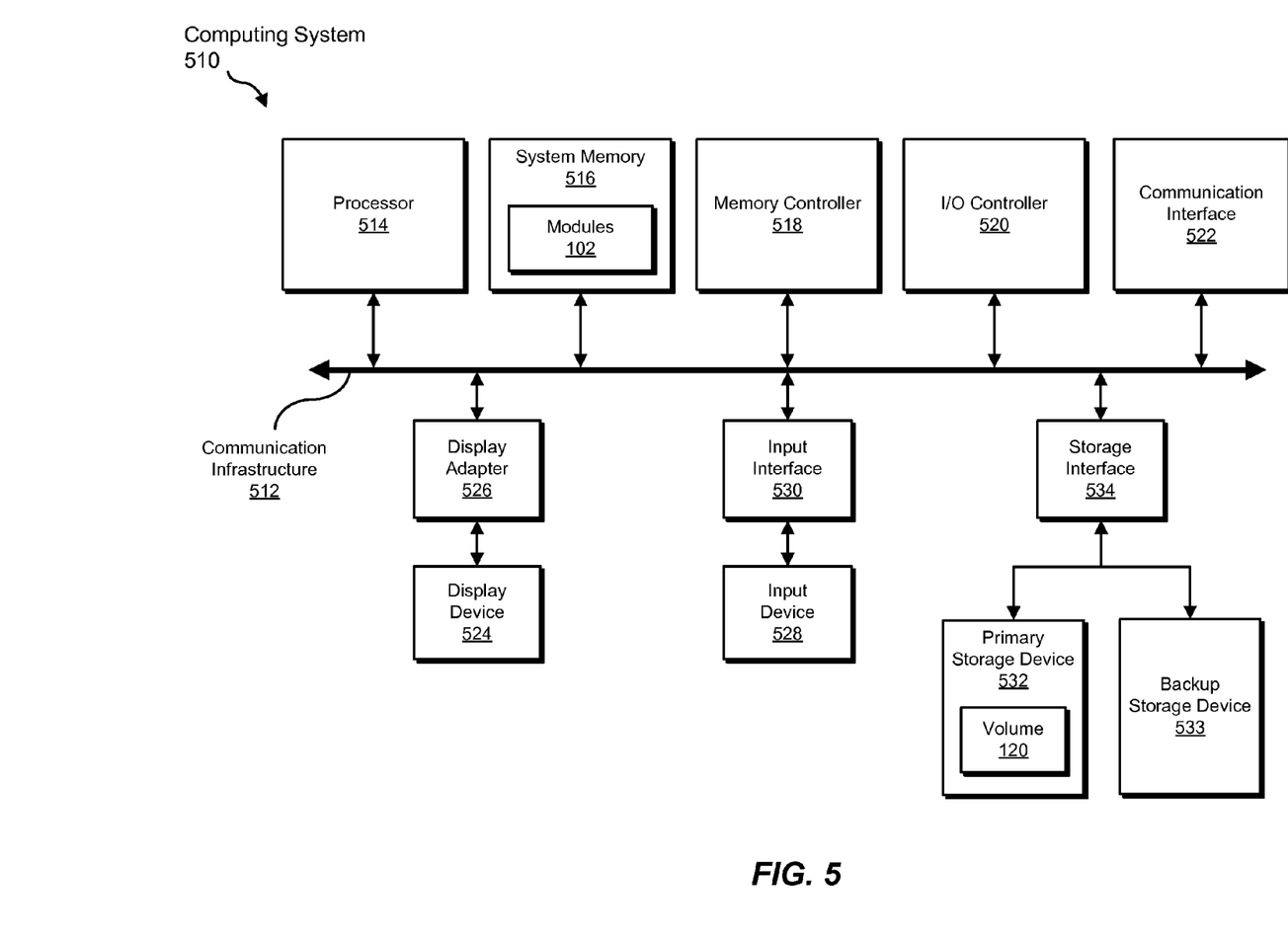
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, saving, supplying, determining, creating, removing, decrementing, configuring, deleting, and/or marking steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, saving, supplying, determining, creating, removing, decrementing, configuring, deleting, and/or marking.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, saving, supplying, determining, creating, removing, decrementing, configuring, deleting, and/or marking steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, saving, supplying, determining, creating, removing, decrementing, configuring, deleting, and/or marking steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, saving, supplying, determining, creating, removing, decrementing, configuring, deleting, and/or marking steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, volume 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, saving, supplying, determining, creating, removing, decrementing, configuring, deleting, and/or marking steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
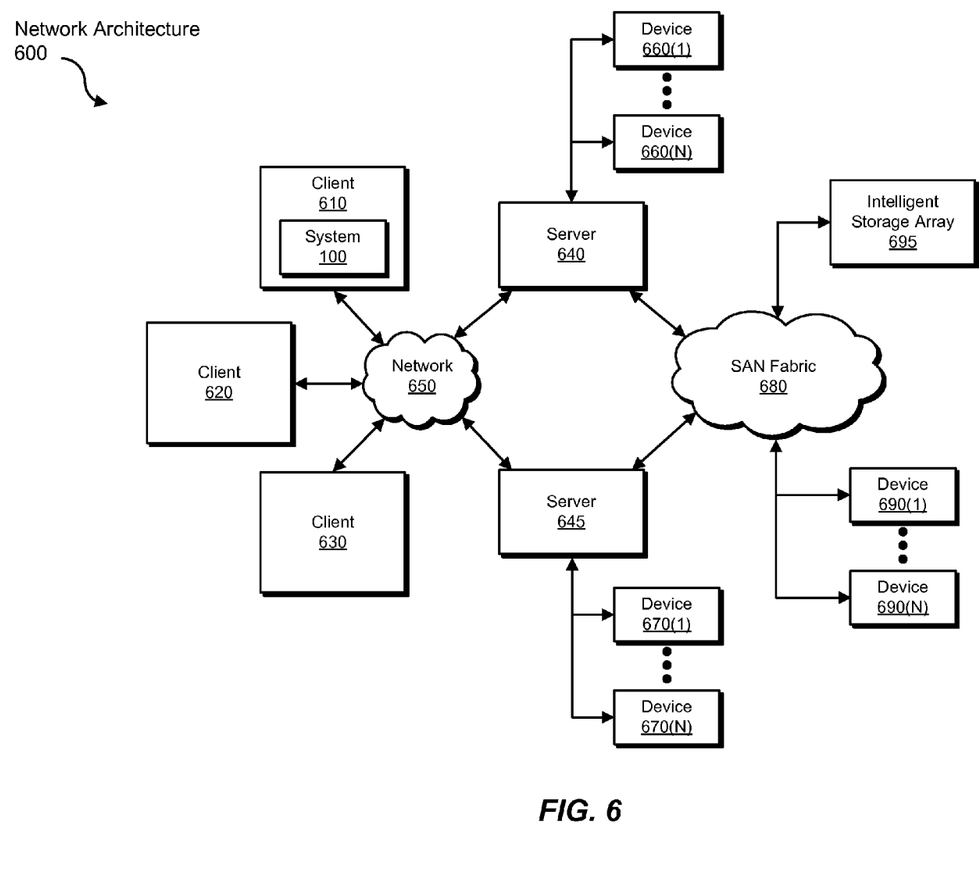
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, saving, supplying, determining, creating, removing, decrementing, configuring, deleting, and/or marking steps disclosed herein. Network architecture 600 may also be used to perform and/or be a means for performing other steps and features set forth in the instant disclosure.

In some examples, systems described herein may represent portions of a cloud-computing or network-based environment. For example, exemplary system 100 in FIG. 1 and/or exemplary system 200 in FIG. 2 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As detailed above, computing system 510 and/or one or more components of network architecture 600 may perform and/or be a means for performing, either alone or in combination with other elements, one or more steps of an exemplary method for change tracking with multiple backup jobs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a backup system into a backup system capable of accurately implementing overlapping backup jobs.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for change tracking with multiple backup jobs, at least a portion of the method being performed by a computing device comprising at least one processor, the method comprising:
    identifying a plurality of overlapping backup jobs to be performed on a volume;
    identifying snapshots taken for any of the plurality of overlapping backup jobs;
    for each consecutive pair of identified snapshots:
        identifying changes made to the volume between the consecutive pair of identified snapshots;
        saving a list of the changes;
        supplying the list of changes for each backup job in the plurality of overlapping backup jobs that requires the list of changes;
        determining that no remaining backup job in the plurality of overlapping backup jobs requires the list of changes by:
            creating a list of backup jobs that require the list of changes,
            removing each backup job from the list of backup jobs after the backup job no longer requires the list of changes by configuring each backup job to remove itself from the list of backup jobs after the backup job no longer requires the list of changes, determining that the list of backup jobs is empty;
deleting the list of changes.

2. The computer-implemented method of claim 1, wherein determining that no remaining backup job requires the list of changes comprises:
creating an association in a database with the list of changes for each backup job in the plurality of overlapping backup jobs that requires the list of changes;
removing the association for each backup job after the backup job no longer requires the list of changes;
determining that no association with the list of changes remains in the database.

3. The computer-implemented method of claim 1, wherein determining that no remaining backup job requires the list of changes comprises:
creating a reference count that tallies the number of backup jobs in the plurality of overlapping backup jobs that require the list of changes;
decrementing the reference count for each backup job once the backup job no longer requires the list of changes;
determining that the reference count equals zero.

4. The computer-implemented method of claim 1, wherein removing each backup job from the list of backup jobs comprises:
identifying at least one inactive backup job in the list of backup jobs;
removing the inactive backup job from the list of backup jobs.

5. The computer-implemented method of claim 1, wherein the plurality of overlapping backup jobs comprises at least one of:
an incremental backup job;
a differential backup job.

6. The computer-implemented method of claim 1, wherein identifying snapshots taken for any of the plurality of overlapping backup jobs comprises identifying a modifiable snapshot.

7. The computer-implemented method of claim 6, further comprising:
identifying changes made to the modifiable snapshot;
saving a list of the changes made to the modifiable snapshot;
supplying the list of changes made to the modifiable snapshot to the backup job in the plurality of overlapping backup jobs that is responsible for the modifiable snapshot;
deleting the list of changes made to the modifiable snapshot.

8. The computer-implemented method of claim 1, further comprising:
identifying an interruption in change tracking between a first snapshot taken for an interrupted backup job and a second snapshot taken for the interrupted backup job;
identifying ambiguous portions of the volume, the ambiguous portions comprising those portions that may have been changed concurrently with the interruption but which are not listed as changed;
identifying at least one uninterrupted list of changes between the first snapshot and the second snapshot;
marking as changed each ambiguous portion of the volume that is listed in the uninterrupted list of changes.

9. The computer-implemented method of claim 1, wherein at least one backup job in the plurality of overlapping backup jobs comprises a block-based backup.

10. The computer-implemented method of claim 1, wherein at least one backup job in the plurality of overlapping backup jobs is configured to track changes to at least one additional volume.

11. A system for change tracking with multiple backup jobs, the system comprising:
an identification module programmed to:
identify a plurality of overlapping backup jobs to be performed on a volume;
identify snapshots taken for any of the plurality of overlapping backup jobs;
a saving module programmed to, for each consecutive pair of identified snapshots:
identify changes made to the volume between the consecutive pair of identified snapshots;
save a list of the changes;
a supplying module programmed to supply the list of changes for each backup job in the plurality of overlapping backup jobs that requires the list of changes;
a deletion module programmed to:
determine that no remaining backup job in the plurality of overlapping jobs requires the list of changes by:
creating a list of backup jobs that require the list of changes,
removing each backup job from the list of backup jobs after the backup job no longer requires the list of changes by configuring each backup job to remove itself from the list of backup jobs after the backup job no longer requires the list of changes,
determining that the list of backup jobs is empty;
delete the list of changes;
at least one processor configured to execute the identification module, the saving module, the supplying module, and the deletion module.

12. The system of claim 11, wherein the deletion module is programmed to determine that no remaining backup job requires the list of changes by:
creating an association in a database with the list of changes for each backup job in the plurality of overlapping backup jobs that requires the list of changes;
removing the association for each backup job once the backup job no longer requires the list of changes;
determining that no association with the list of changes remains in the database.

13. The system of claim 11, wherein the deletion module is programmed to determine that no remaining backup job requires the list of changes by:
creating a reference count that tallies the number of backup jobs in the plurality of overlapping backup jobs that require the list of changes;
decrementing the reference count for each backup job once the backup job no longer requires the list of changes;
determining that the reference count equals zero.

14. The system of claim 11, wherein the deletion module is programmed to remove each backup job from the list of backup jobs by:
identifying at least one inactive backup job in the list of backup jobs;
removing the inactive backup job from the list of backup jobs.

15. The system of claim 11, wherein the plurality of overlapping backup jobs comprises at least one of:
an incremental backup job;
a differential backup job.

16. The system of claim 11, wherein the identification module is programmed to identify snapshots taken for any of the plurality of overlapping backup jobs by identifying a modifiable snapshot.

17. The system of claim 16, wherein:
the saving module is further programmed to:
  identify changes made to the modifiable snapshot;
  save a list of the changes made to the modifiable snapshot;
the supplying module is further programmed to supply the list of changes made to the modifiable snapshot to the backup job in the plurality of overlapping backup jobs that is responsible for the modifiable snapshot;
the deletion module is further programmed to delete the list of changes made to the modifiable snapshot.

18. A non-transitory computer-readable-storage medium comprising one or more computer-executable instructions that, when executed by at least one processor of a computing device, cause the computing device to:
identify a plurality of overlapping backup jobs to be performed on a volume;
identify snapshots taken for any of the plurality of overlapping backup jobs, wherein identifying snapshots taken for any of the plurality of overlapping backup jobs comprises identifying a modifiable snapshot;
for each consecutive pair of identified snapshots:
  identify changes made to the volume between the consecutive pair of identified snapshots;
  save a list of the changes;
  supply the list of changes for each backup job in the plurality of overlapping backup jobs that requires the list of changes;
  determine that no remaining backup job in the plurality of overlapping jobs requires the list of changes;
  delete the list of changes;
identify changes made to the modifiable snapshot;
save a list of the changes made to the modifiable snapshot;
supply the list of changes made to the modifiable snapshot to the backup job in the plurality of overlapping backup jobs that is responsible for the modifiable snapshot;
delete the list of changes made to the modifiable snapshot.

* * * * *